United States Patent [19]
Di Stefano

[11] Patent Number: 5,697,478
[45] Date of Patent: Dec. 16, 1997

[54] SACRIFICAL TUBE SHOCK ATTENUATION

[75] Inventor: Frank J. Di Stefano, El Lago, Tex.

[73] Assignee: Boeing North American, Inc., Seal Beach, Calif.

[21] Appl. No.: 733,062

[22] Filed: Sep. 9, 1996

[51] Int. Cl.$^6$ ........................................ F16F 7/12
[52] U.S. Cl. .................. 188/371; 188/377; 293/133; 297/216.1; 72/705
[58] Field of Search ................... 188/268, 371, 188/374, 376, 377; 267/136, 139; 293/132, 133; 297/216.1, 216.2; 248/548, 549; 74/492; 280/777; 72/453.14, 465, 705

[56] References Cited

U.S. PATENT DOCUMENTS

| | | | |
|---|---|---|---|
| 3,568,806 | 3/1971 | Butt | 188/373 |
| 3,647,028 | 3/1972 | Platus | 188/1 |
| 3,806,180 | 4/1974 | Patterson | 293/1 |
| 4,117,741 | 10/1978 | Yazane et al. | 188/376 X |

*Primary Examiner*—Robert J. Oberleitner
*Assistant Examiner*—Pam Lipka
*Attorney, Agent, or Firm*—Harry B. Field; Steven E. Kahm

[57] ABSTRACT

The sacrificial tube shock attenuation device services as a deformable energy absorbing system designed to be employed between a bumper receiving a potentially destructive force and a payload which is to be protected from the force. The device is composed of a tube assembly running through and aligning apertures of a maul, or series of mauls, which is (are) attached to the bumper and the apertures of a pair of stators, or multiple pairs of stators, that each maul is situated between. The stators are attached to the payload. When overloaded the maul(s) moves relative to the stators causing a misalignment of their respective apertures resulting in deformation of the tube assembly. A simple tube assembly may be comprised of a single tube. A more complex tube assembly may be comprised of multiple tubes within tubes depending on the anticipated overload. In a multi-tube assembly the inner tubes receive the load consecutively as the misalignment of the apertures of the maul and stators progresses. A rod may be inserted into the innermost tube for safety in case the load is high enough to sever each of the tubes in the tube assembly. The rod would stop further misalignment of the apertures of the maul and stators thereby positively limiting stroke. The sacrificial tube shock attenuation device absorbs shocks such that it takes increasing force to deform the tubes as the deformation process progresses.

13 Claims, 4 Drawing Sheets

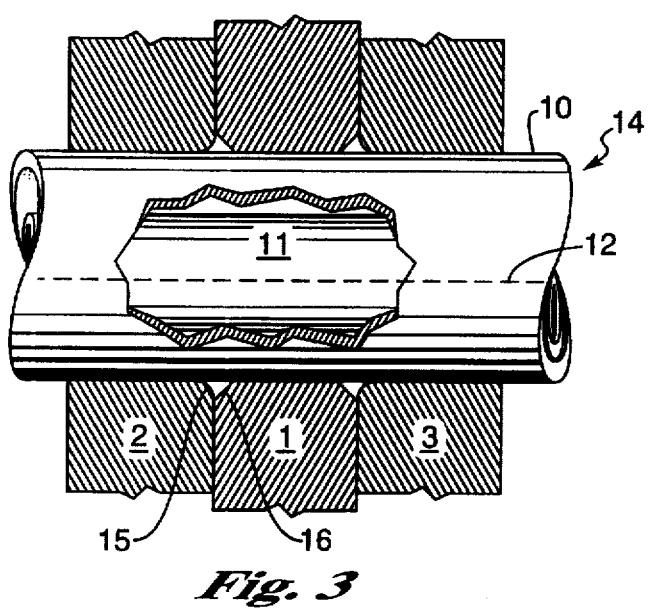 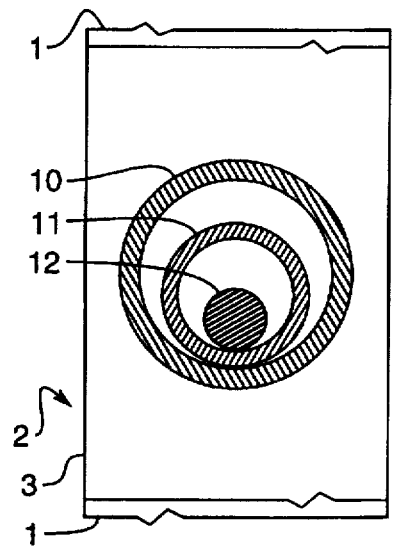
Fig. 3    Fig. 4
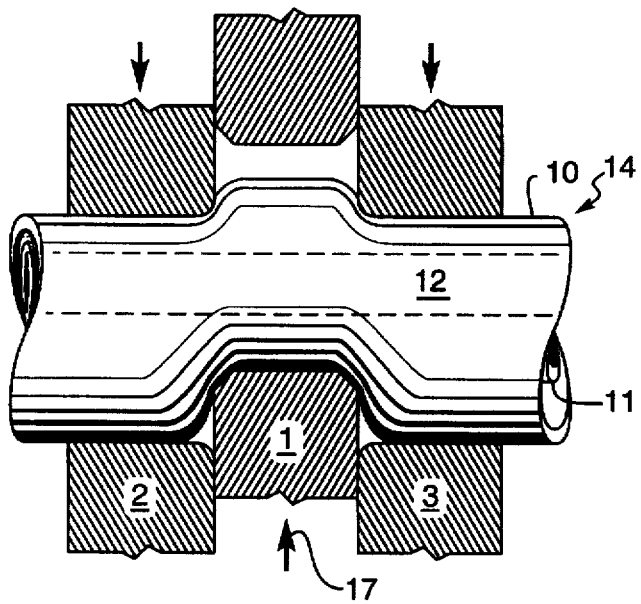 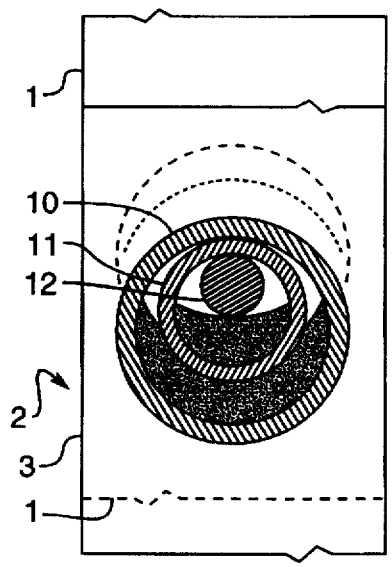
Fig. 5    Fig. 6

(Section I – I)

(Section II – II)

(Section III – III)

(Section IV – IV)

5,697,478

SACRIFICAL TUBE SHOCK ATTENUATION

BACKGROUND OF THE INVENTION

1. Field of the Invention

This invention relates to kinetic energy absorption and more particularly to tubes which deform to attenuate shock loads.

2. Description of the Related Art

Devices for energy absorption use numerous methods including folding tubes and flattening tubes. Both of these methods have unpredictable catastrophic points so that the force absorbed can not be guaranteed with any degree of accuracy. Further once the catastrophic point is reached the energy absorbing capability of the tube ends.

SUMMARY OF THE INVENTION

A tube assembly passing through two stators and a maul for absorbing shocks when the maul through relative motion with the stators engages the tubes and distorts them. The tube assembly comprising one tube or multiple tubes one inside of another wherein each tube is sized to pick up the load just prior to the yield point of each outer tube. The tubes diameter, ductility and wall thickness are factors in determining how much energy is absorbed by the device. Other factors include the number of mauls and stators along a length of tube, the width of the maul engaging the tube and the beveling on the apertures of the maul and stators.

OBJECTS OF THE INVENTION

It is an object of the invention to provide an inexpensive, sacrificial member in a system in order to spare more expensive parts, payloads and/or personnel during crash or other exceptional loading conditions.

It is an object of the invention to provide a light weight means for absorbing shocks.

It is an object of the invention to provide a means for absorbing shocks by deformation of tubes wherein the force to further deform the tubes increases as the deformation increases.

It is an object of the invention to absorb shocks in a relatively short stroke.

It is an object of the invention to provide predictable operational load limits.

It is an object of the invention to control load paths in overstressed assemblies.

It is an object of the invention to provide cost effective assembly repair by simple replacement of deformed tube structure.

Other objects, advantages and novel features of the present invention will become apparent from the following detailed description of the invention when considered in conjunction with the accompanying drawings.

BRIEF DESCRIPTION OF THE DRAWINGS

FIG. 3 is a side view of the tube assembly through a maul and two stators before deformation.

FIG. 4 is an end view of the tube assembly tubes before deformation.

FIG. 5 is a side view of the tube assembly through a maul and two stators after deformation.

FIG. 6 is an end a view of the tube assembly tubes after deformation.

DETAILED DESCRIPTION OF THE PREFERRED EMBODIMENT

Figure 1:
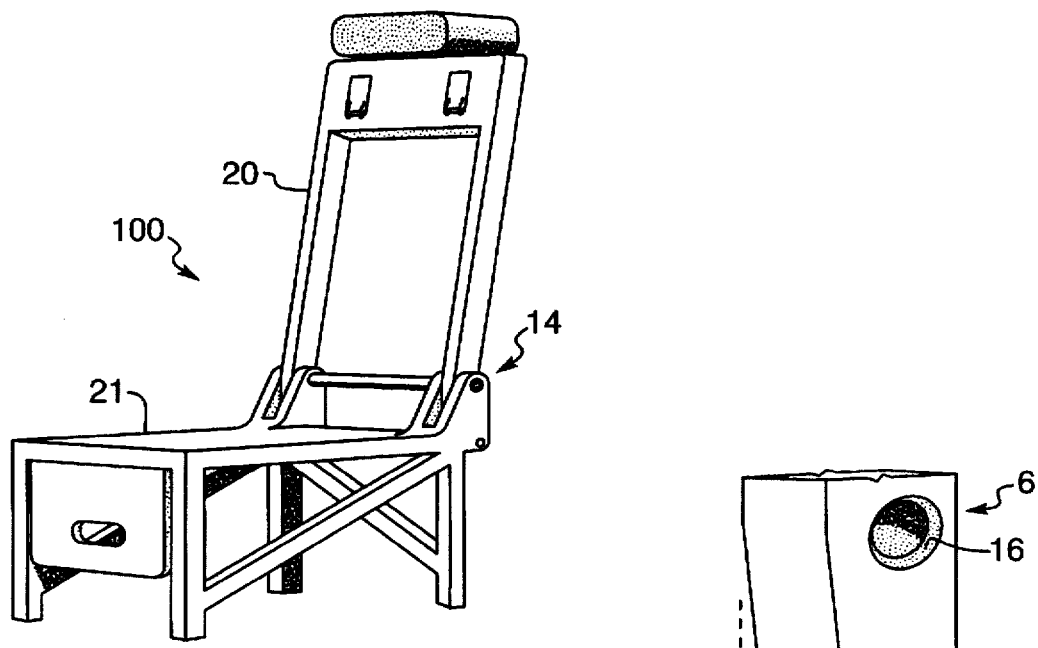
FIG. 1 is a perspective view of the sacrificial tube assembly installed on an aircraft seat.

FIG. 1 is a perspective view of an aircraft seat 100 from a jet fighter having the sacrificial tube shock attenuation device installed. The aircraft seat 100 has a seat back 20, a seat base 21, and a sacrificial tube assembly shown generally as 14. The tube assembly may consist of one tube 10 or a tube 10 with a tube 11 therein, or a tube 10 with a tube 11 therein and a rod 12 in the center, or any number of tubes with or without a rod in the center.

Figure 2:
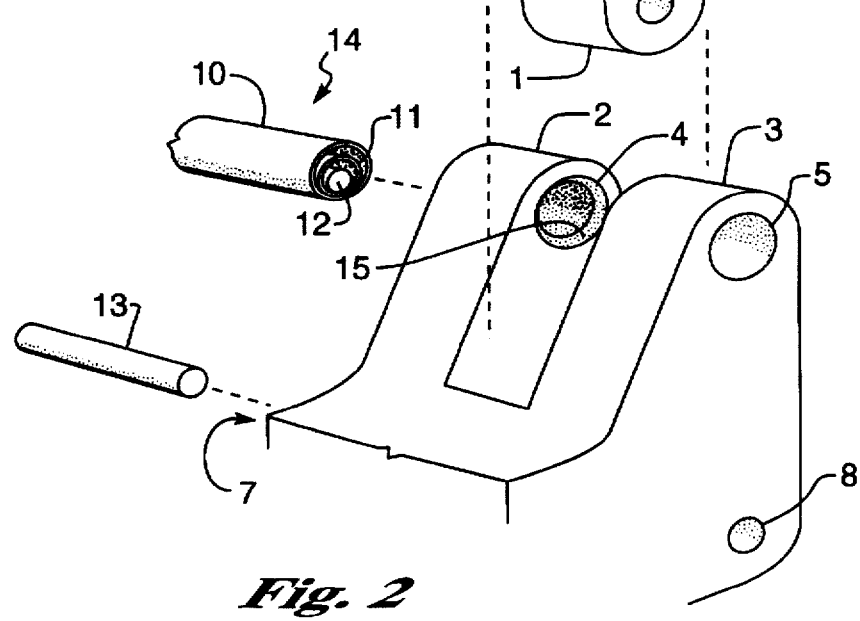
FIG. 2 is a close up perspective view of the sacrificial tube assembly of FIG. 1 showing a maul and two stators and a pivot pin.
Figure 7:
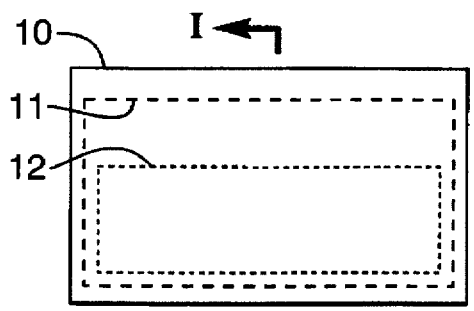
FIG. 7 is a side view of the tubes before deformation.
Figure 8:
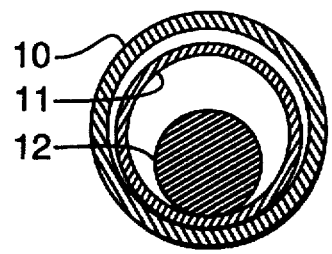
FIG. 8 is a cross section of the tubes of FIG. 7 at section I—I.
Figure 9:
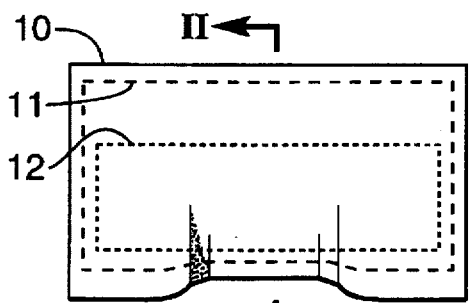
FIG. 9 is a side view of the tubes at a first stage of deformation.
Figure 10:
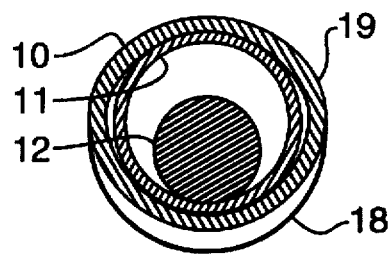
FIG. 10 is a cross section of the tubes of FIG. 9 at section II—II.
Figure 11:
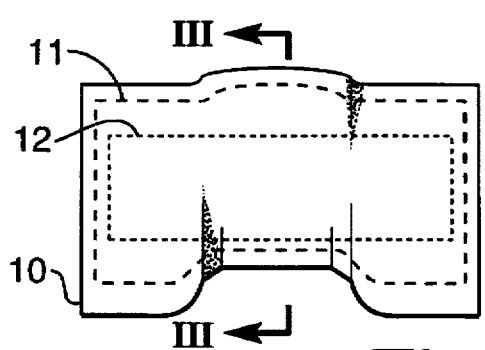
FIG. 11 is a side view of the tubes at a second stage of deformation.
Figure 12:
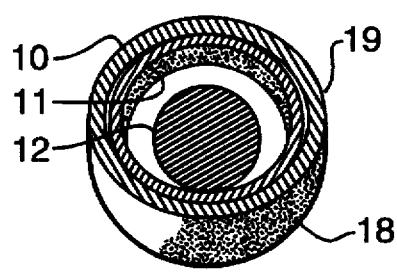
FIG. 12 is a cross section of the tubes of FIG. 11 at section III—III.
Figure 13:
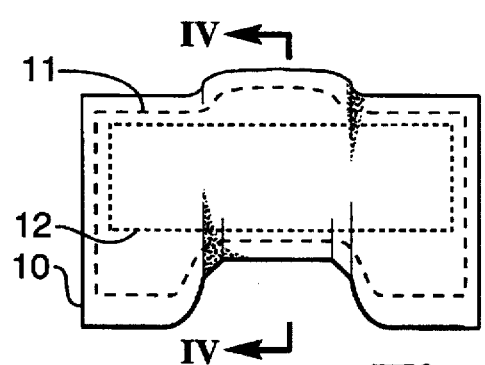
FIG. 13 is a side view of the tubes at maximum deformation.
Figure 14:
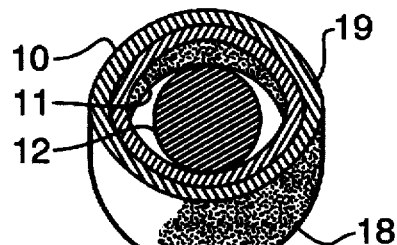
FIG. 14 is a cross section of the tubes of FIG. 13 at section IV—IV.

FIG. 2 is a close-up perspective view of the sacrificial tube shock attenuation device as used on the seat 100 of FIG. 1. A maul 1 which is depicted as part of the seat back's 20 lower left side fits between stators 2 and 3, so that apertures 4, 5 and 6 are aligned and apertures 7, 8 and 9 are aligned. The stators 2 and 3 of the seat base 21 are set to receive the maul 1 of the seat back 20 so that little or no lateral movement of the maul 1 is permitted. The aperture 6 in the maul 1 and the apertures 4 and 5 in stators 2 and 3, which are proximal to the maul 1 are beveled 15, 16 (or radiused) to a predetermined angle (size) to preclude shearing of the tubes 10, 11 and to control tube deformation. In the embodiment shown the sacrificial tube assembly 14, is comprised of an outer tube 10, whose outer diameter (OD) is sized to slip fit into apertures 4, 5, and 6, an inner tube 11, and an innermost rod 12, is slid into apertures 4, 5 and 6 passing through both stators 2 and 3 and the maul 1. The solid hinge pin 13 is installed in aperture 7, 8 and 9 through both stators 2 and 3 of the seat base 21 and the maul 1 of the seat back 20.

During normal operational load, the seat back 20 remains structurally rigid with respect to the seat base 21. For predetermined loads beyond normal, such as crash loads, the sacrificial tube assembly 14 will start to deform. The outer tube 10 whose diameter, wall thickness and materials have been selected for anticipated crash forces will have the section passing through the maul 1 offset axially as the seat back 20 rotates forward (or aft) around the solid hinge pin 13 and as the apertures 4 and 5 of the stators 2, 3 and the aperture 6 of the maul 1 are forced out of alignment. The inner tube 11, which is free floating will be forced by the deformed wall of the outer tube 10 to a position within the outer tube opposing the point at which the maul 1 is applying the force. This will assure full, predetermined deformation of the outer tube 10 before the inner tube 11 begins to pick up the load applied by the maul 1 as its aperture 6 moves further out of alignment with the apertures 4 and 5 in stators 2 and 3. The diameter of the inner tube I 1 and its wall thickness and materials are designed to extend the deformation time and stroke during the attenuation process so that maul 1 deformation forces required for further deformation must continue to increase beyond the failure of the outer tube 10 during the crash episode.

To protect against known or preselected "G" forces, payload mass and center of gravity (C.G.), outer tube 10 and inner tube 11 diameters, wall thicknesses and materials can be selected that will decelerate the load as the tubes deform in such a way as to "flatten" the peak shock wave experienced by the payload (subject) within the stroke traveled by the maul 1 from the OD of the pre-deformed outer tube 10, through the outer tube's deformation, to where it comes to rest just prior to failure of the deformed inner tube 11.

As a backup, safety feature in the event that "G" forces are higher than anticipated, a solid rod 12 internal to the inner tube 11 may be provided to stop the relative movement of the stators 2 and 3 and the maul 1. By the time this happens enough deceleration will have occurred to dampen the shock still remaining in the crash episode so that the payload (subject) should not sustain serious damage (injury).

FIGS. 3 and 4 depict the front and side views of the mauls 2, 3, stator 1 and sacrificial tube assembly 14 before deformation or as it would remain configured within nominal operational loads. The system represented is typical of an assembly set up to protect a payload against tension or compression loads in excess of those desired (e.g. one that would be used between a valuable payload and a bumper).

FIGS. 5 and 6 depict the front and side views of the mauls 2, 3, stator 1 and sacrificial tube assembly 14 after deformation.

In the series of FIGS. 7–14, the tubes 10 and 11 are shown before deformation and in varying stages of deformation. Showing how the tubes 10 and 11 absorb the energy imparted by the maul 1.

Multiple sets of stators 2 and 3 and mauls 1 may be used through which a long tube assembly may be passed. The tubes can vary in diameter, wall thickness, and materials. Multiple or no inner tubes may be used and a safety rod may or may not be used depending on anticipated circumstances. The apertures in the stators 2 and 3 and the maul 1 through which the tube assemblies pass are beveled 15, 16 (or radiused) on both surfaces of the maul 1 and the surfaces of the stators 2 and 3 facing the maul 1 to preclude shearing of the tubes 10, 11 and to control tube deformation.

FIG. 3 shows the maul 1 and stators 2, 3 before a compression load is applied. The outer tube 10 and inner tube 11 are not deformed.

FIG. 5 shows the maul 1 and stators 2, 3 after a compression load is applied. The outer tube 10 and inner tube 11 are deformed.

Figure 15:
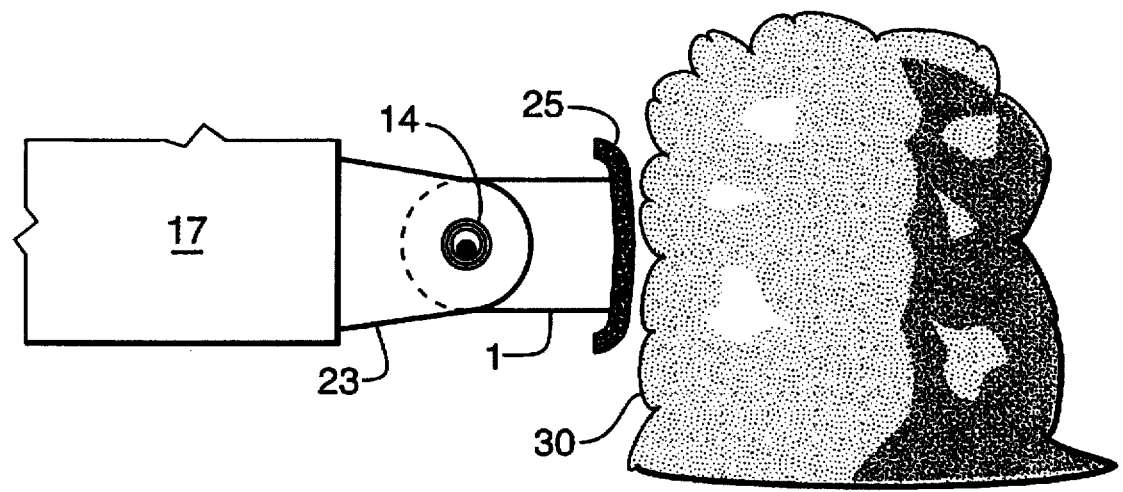
FIG. 15 shows a bumper using the sacrificial tube assembly.

FIG. 15 depicts the compression of tubes 10 and 11 when the maul I and stators 2 and 3 react to a compression load. [e.g. an assembly consisting of a valuable payload 17 attached to the stators 2 and 3, a bumper 25 attached to the maul(s) 1 wherein the payload and bumper parts are attached by passing a sacrificial, shock attenuation tube assembly 14 through the stators 2 and 3 and the maul 1 as depicted]. As shown in FIG. 15 when the system moves in one direction, the bumper 25 attached to the maul(s) 1 strikes an object 30 and imparts a load to the system beyond normal operating loads. The maul 1 is forced out of position with respect to the stators 2 and 3 and their respective apertures 4, 5, and 6 are forced out of alignment. As this occurs the sacrificial tube assembly 14 attenuates the shock to the payload by absorbing the energy as the outer tube 10 distorts axially. This distortion is unique to this system in that the tube section being moved by the maul tends to keep its circular cross section as depicted in FIGS. 7–14. The result of this is that as the outer tube 10 distorts, the forces required to distort it further must increase. In a dynamic episode (as in our example) this required increase in load would serve to decelerate the impact. In a single event, static episode this required increase in load to distort the tube further as the tube deforms would serve to stop distortion by essentially raising the operational load capability of the tube assembly. As the load on the sacrificial tube assembly 14 increases the outer tube 10 has been offset to a predetermined point just prior to failure. At this point the free floating inner tube 11 has been moved into position by the displacement of the outer tube 10 at the section of the tube assembly where the maul 1 is imparting the load; so that the inner tube 11 starts sharing the load imparted by the bumper's 25 maul 1. Like the outer tube 10, the inner tube's 11 diameter, wall thickness and materials have been carefully selected to maximize deceleration of the anticipated impact's force with a short, smooth stroke. As the inner tube 11 becomes deformed, the forces required to deform it further must continue to increase. If the dynamic load anticipated was correct, the deformation of the tube assembly will have decelerated the impact to a full stop prior to transferring a load that would damage the valuable payload. For those cases where loads cannot be accurately anticipated, a solid, internal, free floating rod 12 may be provided.

In FIGS. 5 and 6, at full stroke, both the outer tube 10 and the inner tube 11 have been offset axially in the location of the maul 1 to a condition where the internal clearance has been restricted to a dimension matching the OD of the solid safety rod 12. The rod 12 picks up the load at this point and any relative motion between the maul 1 and stators 2 and 3 stops. Because the outer tube 10 and inner tube 11 never reach failure and because forces required to increase tube deformation during shock stroke also must increase, shock forces transferred to the stators 2 and 3 remain flat, relative movement has been stopped, and shock has been attenuated to within acceptable levels.

As seen in the figures tube deformation occurs when the apertures 4, 5, and 6 that the tube assembly 14 aligns in and passes through in the stators 2, 3 and maul 1 are knocked out of alignment by forces acting on the stators 2, 3 and mauls 1 that are higher than operational forces desired for the safety of the load 17 or person to be protected by the system. Because the stators 2, 3 and mauls 1 are located in close proximity with a maul 1 positioned between each pair of stators 2, 3, the forces causing them to move relative to each other get transferred to the tube assembly 14 when their apertures are knocked out of alignment such that the tube section passing through the maul 1 moves with the maul and its aperture 6 while the tube sections on either side which pass through the apertures 4, 5 in the stators 2, 3 remain in their original positions and remain aligned with each other. The tube assembly sections that move with the maul 1 stays attached to the tube sections on either side which pass through the stators because the aperture openings through all adjacent parts (the mauls and stators) are radiused 15, 16 (or beveled) to preclude shearing of the tube. Because the outer tube's 10 outside diameter is only slightly smaller than the inside diameter of the apertures 4, 5 and 6 passing through the mauls and stators, the sections of the tubes in the aperture 6 of the maul 1 which is being offset tends to retain their cylindrical shape but eventually is forced into an ellipsoid cross section 19. The sections of the tubes passing through the apertures 4,5 in the stators 2, 3 retain their cylindrical shapes 18. The forces required to deform the tube in this way and the amount the offset section of the tube can be moved prior to tube failure depends on the ductility of the tube material used. The maul 1 and stators 2, 3 behave like tools cold forming the tube into this offset shape. The energy required to form the offset equates to the energy impacting the maul through a bumper 25 to which the maul 1 may be attached.

A "bumper" 25 as in FIG. 15 is that pan of an assembly that is positioned to receive and withstand initial impact during a crash or collision episode with an object 30. In our assembly the bumper 25 has a maul 1 (or series of mauls) hard mounted to it such that the direction of the impact load is through the bumper 25 to the mauls causing each maul to move relative to its pair of stators 2, 3 which in turn are attached to that part of the assembly to be protected, the payload 17. These two parts of the assembly (the bumper 25 and the payload 17) are connected via the sacrificial tube assembly 14 passing through their stators 2, 3 and mauls 1. The deformation of this sacrificial tube assembly 14 as described above is what protects the load 17 from the high "G" impact received by the bumper 25.

As the tubes 10, 11 deform the energy applied must increase to deform it further. Therefore in cases where a static load is applied in tension or compression which exceeds the capacity of the non deformed tubes, the tubes will deform to a point where further deformation would require an even greater static load.

This phenomenon also occurs during the application of dynamic loads to such a system (e.g. crash loads). The impulse of energy caused by the impact is absorbed by the work required to deform the tube. The high "G" spike associated with the crash episode is thus flattened to a "G" load that can be tolerated by the payload. This system is especially useful in cramped or tight situations where the deceleration stroke length must be limited.

Repair of the system after a crash episode amounts to merely removing the deformed, sacrificial tube assembly 14, realigning the apertures 4, 5, and 6 of the maul 1 and stators 2, 3 sets and slipping a new sacrificial tube assembly through the aligned apertures. Tube deformation ranges may be varied in a particular system (as in the example of the seat 100 in FIG. 1, by merely selecting a tube 10 with a different wall thickness and ductility or by using tubes within tubes. In this way a wide range of payload masses can be accommodated for a given crash load in a standard seat.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A sacrificial tube shock attenuation device comprising,
    a first stator having a hole passing through it,
    a second stator having a hole passing through it, the second stator being parallel to and proximate the first stator,
    a maul having a hole passing through it, the maul extending between the first stator and the second stator,
    a tube assembly for absorbing shocks, inserted through the hole in the maul and the first and second stators, such that when the maul move relative to the first and second stators the maul applies a force to the tube assembly deforming the tube assembly by compressing the maul against the tube assembly.

2. A sacrificial tube shock attenuation device as in claim 1 wherein,
    a rod is placed inside the tube assembly for safety to prevent the maul from shearing all the way through the tube assembly.

3. A sacrificial tube shock attenuation device as in claim 1 wherein,
    the maul is beveled to increase the deformation of the tube assembly without shearing it.

4. A sacrificial tube shock attenuation device as in claim 1 wherein,
    the stators are beveled to increase the deformation of the tube assembly without shearing it.

5. A sacrificial tube shock attenuation device as in claim 1 wherein,
    the apertures in the maul are beveled to increase the deformation of the tube assembly without shearing it.

6. A sacrificial tube shock attenuation device as in claim 1 wherein,
    the apertures in the stators are beveled and the stators are beveled to increase the deformation of the tube assembly without shearing it.

7. A sacrificial tube shock attenuation device as in claim 1 wherein, a plurality of stator and maul assemblies are used to engage the tube assembly for absorbing the shock.

8. A sacrificial tube shock attenuation device as in claim 1 wherein,
    the tube assembly comprises one tube.

9. A sacrificial tube shock attenuation device as in claim 1 wherein,
    the tube assembly comprises an outer tube and an inner tube inside the outer tube.

10. A sacrificial tube shock attenuation device as in claim 1 wherein,
    the tube assembly comprises an outer tube and an inner tube inside the outer tube and a rod inside the inner tube.

11. A sacrificial tube shock attenuation device as in claim 1 wherein,
    the tube assembly comprises at least three tubes one inside the other.

12. A sacrificial tube shock attenuation device as in claim 1 wherein,
    the tube assembly comprises at least three tubes one inside the other and a rod inside the inner most tube.

13. A sacrificial tube shock attenuation device as in claim 1 wherein,
    the maul has a pin aperture, the stators have a pin aperture and a pin is inserted through the maul and stator apertures such that the maul pivots relative to the stators about the pin.

* * * * *